Nov. 12, 1940. G. T. LAMPTON 2,221,548
METHOD OF MAKING PROPELLER BLADES
Filed Nov. 22, 1937 3 Sheets-Sheet 1
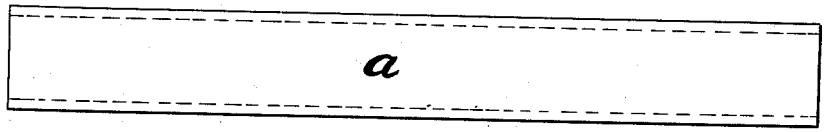
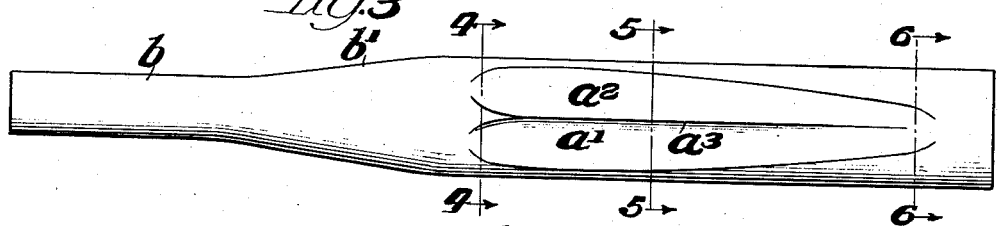
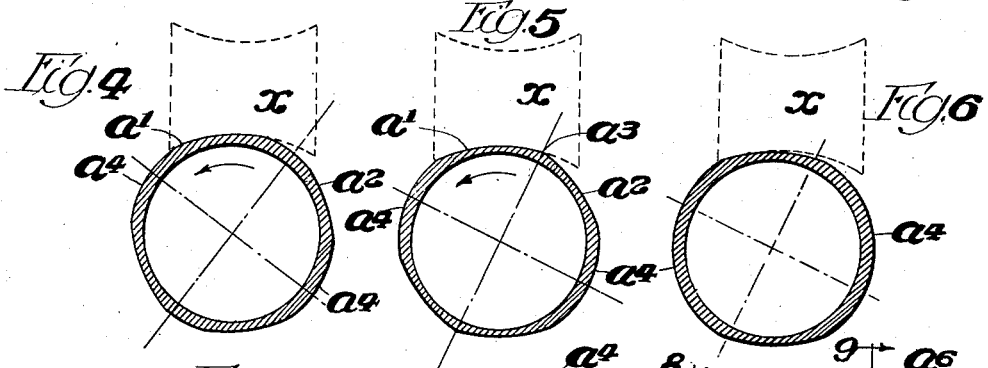
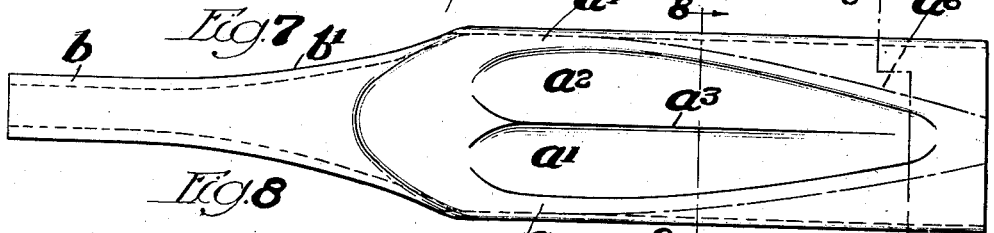
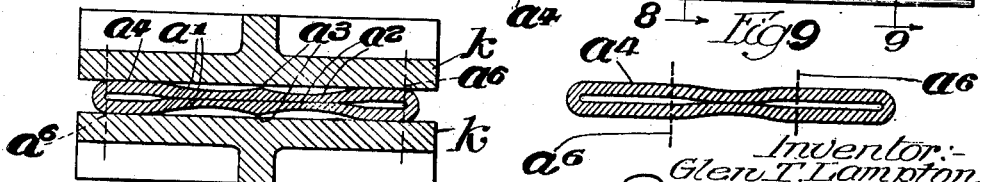
Inventor:-
Glen T. Lampton
By Fred Gerlach
his Atty.

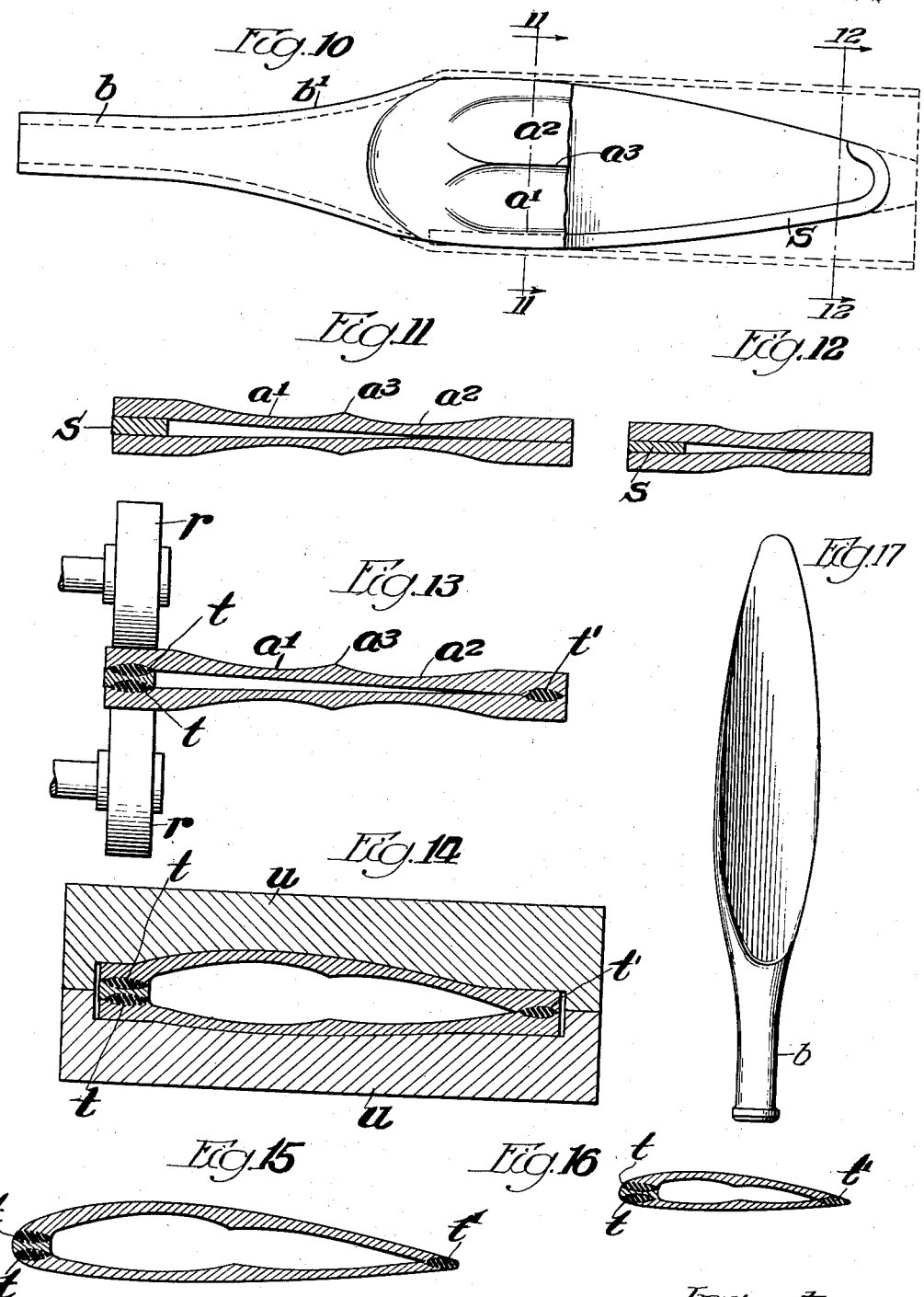

Nov. 12, 1940.　　　　G. T. LAMPTON　　　　2,221,548
METHOD OF MAKING PROPELLER BLADES
Filed Nov. 22, 1937　　　3 Sheets-Sheet 3
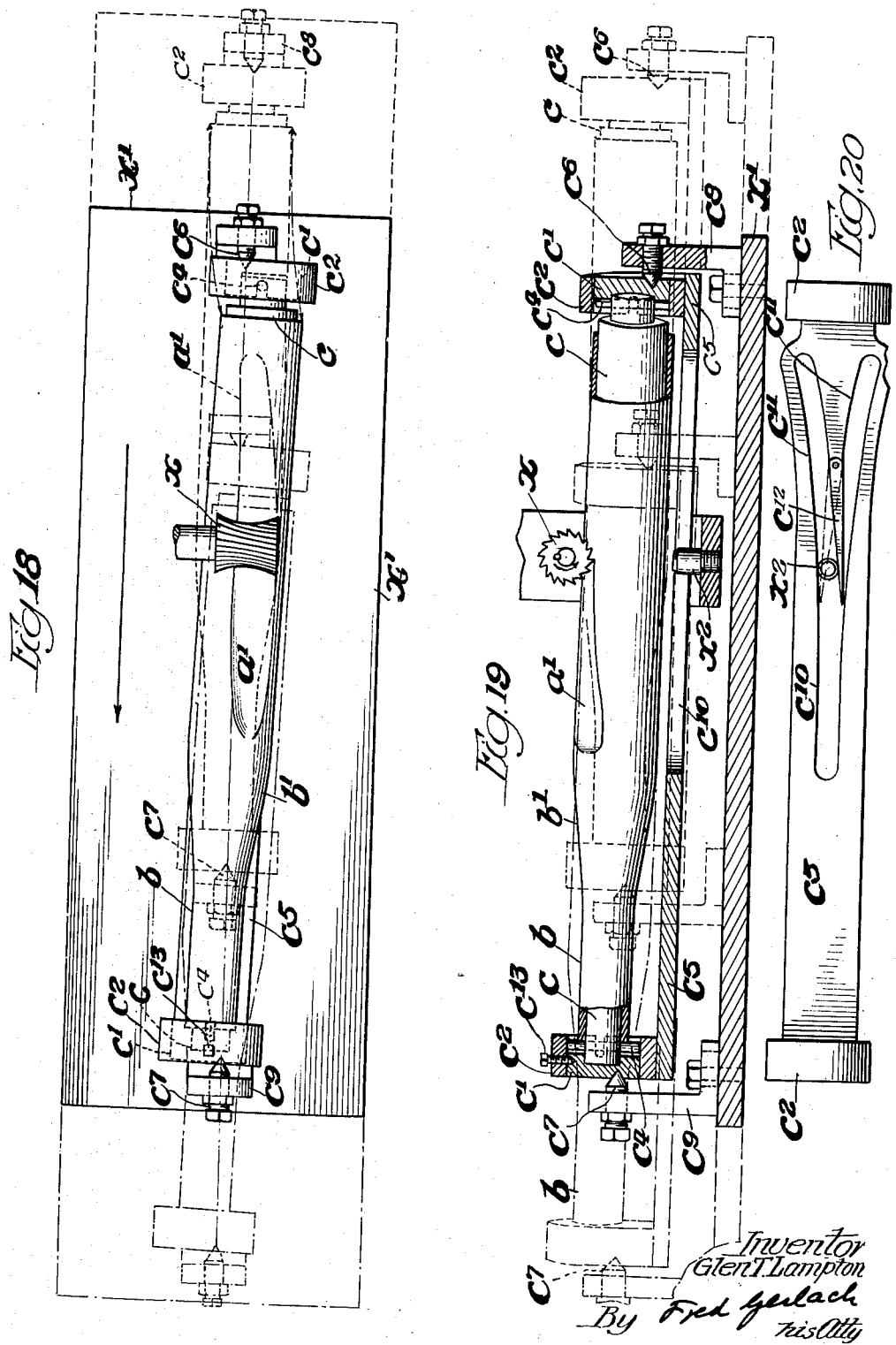

Patented Nov. 12, 1940

2,221,548

UNITED STATES PATENT OFFICE 2,221,548

METHOD OF MAKING PROPELLER BLADES

Glen T. Lampton, Williamsport, Pa., assignor to Aviation Manufacturing Corporation, Williamsport, Pa., a corporation of Delaware Application November 22, 1937, Serial No. 175,782

6 Claims (Cl. 29—156.8)

The invention relates to the manufacture of hollow steel propeller-blades for aircraft.

The objects of the invention are to provide a method: by which a tubular blank of mild carbon steel is flattened, trimmed to form face-sections, and the inner faces of the sections are welded together for effective union at the leading and trailing edges, with a concomitant increase of strength and endurance; by which the inner faces of the face-sections are united by resistance and lap-welding over a great area for effective union of their edges and increase of strength and endurance; by which portions of the face-sections are cut away by milling operations to economically produce the desired variation of wall-thickness in different portions of the face-sections; by which the face-sections along mid-chord lines are formed wtih a greater wall-thickness for resistance to transverse moments to which the blade is subjected in operation; by which the outer face-section will be provided with smooth outer faces and increased thickness along mid-chord lines; by which the blade will be formed from a tubular blank with face-sections having their inner faces welded together at their margins for an increase of strength and endurance of their edges in use and reduced wall-thickness between their margins for lightness; and other objects which will appear from the detail description.

The invention consists in the several novel features which are hereinafter set forth and are more particularly defined by claims at the conclusion hereof.

In the drawings: Fig. 1 is a plan of the tubular blank. Fig. 2 is a section of the swaged and upset blank to form the shank thereon. Fig. 3 is a plan of the blank with the milling cuts made thereon for varying the wall-thickness in the blade-faces. Figs. 4, 5 and 6 are transverse sections on lines 4—4, 5—5, and 6—6, respectively, of Fig. 3. Fig. 7 is a plan of the flattened blank. Fig. 8 is a section of the blank on line 8—8 of Fig. 7, in a flattening press. Fig. 9 is a section on line 9—9 of Fig. 7. Fig. 10 is a plan of the flattened blank trimmed to contour for the blade-faces with a welding-strip inserted at the leading edge. Fig. 11 is a section on line 11—11 of Fig. 10. Fig. 12 is a section on line 12—12 of Fig. 10. Fig. 13 is a transverse section illustrating the resistance-welding of the face-sections under pressure. Fig. 14 is a section illustrating the expansion of the welded blank to airfoil form. Fig. 15 is a transverse section mid-length of the faces of the finished blade. Fig. 16 is a similar section adjacent the tip of the blade. Fig. 17 is a perspective of the finished blade. Fig. 18 is a plan and Fig. 19 is a front elevation illustrating the milling operation on the tubular blank. Fig. 20 is a plan of the guide for controlling the milling cuts.

A tubular blank $a$ of uniform diameter of steel containing sustantially: carbon, .25 to .35%; manganese, .30 to 50%; chromium, .50 to .80%; nickel, 1.50 to 2.00%; molybdenum, .30 to .40%; phosphorus, .04%; sulphur, .05%, is swaged and upset in axial direction adjacent one of its ends to provide a shank $b$ of adequate wall-thickness for attachment to a propeller-hub, and a portion $b'$ of gradually increasing diameter and decreasing wall-thickness.

Next, the outside portion of the blank-wall is cut away by four successive milling operations to vary the wall-thickness for the central portions of the blade-faces and to leave full wall-thickness at their edges. The blank is forced around arbor $c$. The arbor is then placed in chucks $c^1$ which are secured by screws $c^{13}$ in heads $c^2$ which are connected by a member $c^5$ to form a rotatable holder. The arbor is secured to rotate with the holder by pins $c^4$ which fit into pairs of a series of four notches in the chucks and is movable longitudinally with heads $c^2$. Chucks $c^1$ are rotatable in, and travel longitudinally with, carriage $x^1$, which is slidably mounted on the usual bed of a milling machine, for rectilinear longitudinal movement under the axially concave milling cutter $x$ which rotates on a fixed transverse axis. The chucks are journaled on pointed pivot studs $c^6$, $c^7$ adjustably mounted on standard $c^8$ and standard $c^9$ on carriage $x^1$, respectively. The axis of studs $c^6$, $c^7$ is in a vertical plane parallel to the carriage stroke. The studs engage conical bearings in chucks $c^1$ which are transversely and oppositely eccentric to the arbor-axis so that rotation of the blank on the studs will move its periphery into the path of cutter $x$. Studs $c^6$, $c^7$ are vertically offset so the blank in its longitudinal movement, will gradually recede from the cutter to decrease the depth of the cut. The rotative movement of the blank is controlled by stationary stud $x^2$ which extends into slot $c^{10}$ with curved branches $c^{11}$ and a switch $c^{12}$ in member $c^5$ according to the desired transverse movement of the blank relatively to the cutter. Each longitudinal left-hand stroke of carriage $x^1$ cuts one of the zones $a^1$, $a^2$ in the periphery of the blank. At the commencement of each stroke, the cutter is positioned adjacent the outer end of the flared portion of the blank, and stud $x^2$ is in the end of one branch $c^{11}$ of slot $c^{10}$ in member $c^5$. When carriage $x^1$ is shifted to the left, the curve in slot $c^{11}$ will turn the blank eccentrically on studs $c^6$, $c^7$ into the path of the cutter. When the cutter reaches the point of desired maximum of width of cut, approximately mid-length of the blank-portion used for the blade-faces, rotation of the blank ceases and stud $x^2$ will ride in slot $c^{10}$ of the blank. During the remainder of the stroke, the downward inclination of the blank will lower the blank to decrease the depth of the cut until the cutter passes out of the blank. Arbor c is next set to bring the blank and the core 180° from the first setting and the milling operation is repeated. Next, chucks $c^1$ are set on studs $c^6$, $c^7$ to bring the blank into position to make one of the cuts $a^2$ adjacent one of the cuts $a^1$ by eccentric rotation of the blank. Stud $x^2$ is positioned in the end of the oppositely curved branch $c^{11}$ of the slot 10. The blank will then be rotated oppositely and moved toward the cutter during the next stroke of the carriage. This will make cut $a^2$ so it will merge into and overlap the contiguous cut $a^1$, and from approximately mid-length of the cut the blank will gradually recede from cutter x and the depth of the cut will gradually decrease near the outer end of the blank. This operation is repeated at 180° of the blank for the second recess $a^2$. These cuts leave a ridge $a^3$ between each pair of recesses $a^1$, $a^2$ and leave diametrically opposite portions $a^4$ of full wall-thickness. These portions $a^4$ provide maximum wall-thickness for the edges of the blades and portions of reduced wall-thickness between portions $a^4$ and the mid-chord line are provided to effect a saving of weight and with a greater wall-thickness on the mid-chord line for resisting the transverse movements to which the blade-faces are subjected in use. If it is desired to taper the wall-thickness toward the tip, the blank and arbor may be inclined upwardly to produce cuts of increased depth.

The recessed portion of the blank is next heated below recalescence and flattened between dies k (Fig. 8) into the plan-form illustrated in Fig. 7. The centers of portions $a^4$ of full wall-thickness at the folding lines and ridges $a^3$ located mid-chord of the flattened portions and portions $a^1$, $a^2$ will be between the ridges and portions $a^4$.

The blank is cut on line $a^6$ through the double wall-thickness at its folded edges and its outer end to form sections of approximately blade-face contour.

A flat strip s, which is curved to conform to one edge and the tip of the blade, tapers in thickness longitudinally to a sharp edge, and is of sufficient width to provide ample weld area for joining the face-sections together by lap-welds, is inserted between the sections along one edge and around the tip. The margins of the face-sections are pressed together by, and passed between, welding-rolls r of the type used for resistance-welding. The margins of the inner faces of the face-sections at one edge and around the tip are welded to contiguous parallel faces of the strip s and the margins of said inner faces along the other edge are welded directly together at $t^1$. A potential is supplied and pressure is applied to the rolls to force and weld the parts together. The face-sections between the rolls complete an electrical circuit and the existing physical gap or gaps in the joint produce increased electrical resistance to the flow of current through it with an attendant high temperature at these points. The short-circuiting of the potential impressed between the rolls produces a sufficiently high temperature to fuse the metal at the joint over a wide area t for an efficient union. The effectiveness of the weld depends usually on reduced resistance to current flow through the main layers of the joint and an increased resistance to flow at the points where the layers are in contact. The weld improves as the contacting faces of the parts become closer to each other. To obtain the most efficient union in resistance welding the metal should be such that local shrinkage at the point of weld be eliminated or minimized. The reduction of the carbon and manganese contents of the steel effectively produces this result. This welding of the face-sections produces leading and trailing edges formed by lap-welds of great areas between the inner faces of the sections, and the resistance-weld renders it highly efficient against rupture or failure in high-speed operation. Greater welded areas are achieved between the face-sections than are possible as heretofore practiced.

The welded blank is next heated above recalescence temperature and shaped between shaping-dies u having cavities corresponding substantially to the desired airfoil contour of the outside of the faces. When the dies are closed, a compressed inert gas is admitted to the chamber in the blade for expanding the blade. During this expansion the relieved portions $a^1$, $a^2$ on the outer faces of the face-sections are forced against and re-shaped by the die-faces so their outer faces will be smooth and the protuberances or ridges at mid-chord will be on the inside of the blade.

The leading and trailing edges are finished to the desired airfoil contour (Figs. 15, 16 and 17) and the blades are tempered and polished or otherwise treated to produce the desired physical properties in the finished blade.

The improved method produces a finished hollow steel blade from a tubular blank of a steel alloy; which has a suitable low carbon and manganese content for resistance-welding the leading and trailing edges and which, under test, have shown an ultimate strength of 175,000 pounds per square inch after tempering; which is formed of an integral tubular shank and face-sections having their margins united by resistance and lap-welding between great areas of their inner faces; and which has a high ratio of fatigue limit to ultimate tensile strength and comparative insensitivity to notch effects from heavy abrasions, scratches and nicks under high fatiguing loads; which comprises face-sections of greater wall-thickness along mid-chord lines for resisting the transverse moments to which the blade is subjected; which has face-sections varying in wall-thickness, as desired for lightness; and which is economically produced by simple mill-cutting operations.

The invention exemplifies a method in which the blade in formed of a tubular blank of a steel alloy relatively low carbon and manganese content which improves the resistance of metal to, and adapts it for, resistance-welding. Specimens of this steel, under test, have shown an ultimate strength of as high as 250,000 lbs. per square inch which may be tempered to an ultimate strength of 175,000 lbs. per square inch. The method results in a high ratio of fatigue limit to ultimate tensile strength and comparative insensibility to notch-effects from heavy abrasion, scratches and nicks under high fatiguing loads.

The invention also exemplifies a method by which the sections forming the blade-faces are joined by lap-welding and are of great area for producing an efficient joint for the leading and trailing edges of the blade. The invention also exemplifies a method of making blades with face-sections of greater wall-thickness on the mid-port lines and full wall-thickness at the leading and trailing edges and in the intermediate zones which results in lightness and provides for resisting the transverse moments to which the blade is subjected.

The invention also exemplifies a simple, efficient and economic method of providing different wall-thicknesses, as required, in the blade by simple mill-cutting operations.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The method of making a hollow steel propeller-blade which comprises cutting away two longitudinally-extending adjacent zones from each of two diametrically opposite portions of a tubular blank, and leaving a greater wall-thickness between the zones of each pair, one pair of zones being spaced from the other pair, to leave substantially full wall-thickness between them, and cutting the blank to form face-sections, each having substantially full wall-thickness at its margins and a greater wall-thickness along its mid-chord line than in the cut-away zones.

2. The method of making a hollow steel propeller-blade which comprises cutting away two longitudinally-extending adjacent zones from each of two diametrically opposite portions of the outside of a tubular blank, and leaving a greater wall-thickness between the zones of each pair, one pair of zones being spaced from the other to leave substantially full wall-thickness between them, flattening the blank with the bends along the centers of the portions of full wall-thickness, severing the blank at the bends, to form face-sections, each having full wall-thickness at its margins and a greater wall-thickness along its mid-chord line than in the cut-away zones, and welding together the margins of the sections.

3. The method of making a hollow steel propeller-blade which comprises shaping a tubular blank to form a shank of reduced diameter, with a portion of greater diameter for forming the face-sections of the blade, cutting away the outside of the portion of greater diameter used for the face-sections to leave longitudinally extending zones of reduced wall-thickness between the margins and the mid-chord points of the face-sections, flattening the blank and cutting it to form the blade-sections, welding together the margins of the sections to form the leading and trailing edges of the blade, and shaping the face-sections to provide camber and pressure faces of reduced wall-thickness between mid-chord lines and the leading and trailing edges.

4. The method of making a hollow steel propeller-blade which comprises cutting away longitudinally-extending portions from diametrically opposite portions of the outside of a tubular blank, and leaving substantially full wall-thickness along diametrically opposite zones and a greater wall-thickness along the center of the cut-away portions than in the cut-away portions, forming the blank into face-sections, and reshaping the walls of the face-sections to form smooth outer surfaces on the outside thereof.

5. That improvement in making a hollow steel propeller-blade which comprises, placing a tubular blank on a core, successively mill-cutting for each face-section two longitudinally adjoining zones from the outer periphery of the blank by relative longitudinal movement and eccentric rotation of the blank and cutter, to form portions of reduced wall-thickness between portions of full wall-thickness in each section, and shaping the face-sections into camber and pressure blade-faces having portions of reduced wall-thickness between, and full wall-thickness adjacent, their margins.

6. That improvement in making a hollow steel propeller-blade which comprises, placing a tubular blank on a core, successively mill-cutting longitudinal zones from the outer periphery of the blank by relative longitudinal movement and eccentric rotation of the blank and cutter to form portions of reduced wall-thickness between portions of full wall-thickness in each section, flattening the blank by folds along lines central of the portions of full wall-thickness, severing margins of the folded blank to form face-sections having portions of reduced wall-thickness between their margins, welding the margins of full wall-thickness together to form the leading and trailing edges of the blade, and shaping the sections to form pressure and camber faces of varying wall-thickness.

GLEN T. LAMPTON.